(12) United States Patent
Nilsson et al.

(10) Patent No.: US 11,271,696 B2
(45) Date of Patent: *Mar. 8, 2022

(54) BEAM MANAGEMENT OF A RADIO TRANSCEIVER DEVICE

(71) Applicant: Telefonaktiebolaget LM Ericsson (publ), Stockholm (SE)

(72) Inventors: Andreas Nilsson, Gothenburg (SE); Fredrik Athley, Kullavik (SE); Sven Petersson, Sävedalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 57 days.

This patent is subject to a terminal disclaimer.

(21) Appl. No.: 16/645,899

(22) PCT Filed: Oct. 10, 2017

(86) PCT No.: PCT/SE2017/050993
§ 371 (c)(1),
(2) Date: Mar. 10, 2020

(87) PCT Pub. No.: WO2019/074409
PCT Pub. Date: Apr. 18, 2019

(65) Prior Publication Data
US 2020/0280408 A1    Sep. 3, 2020

(51) Int. Cl.
*H04L 5/00* (2006.01)
*H04B 7/10* (2017.01)

(52) U.S. Cl.
CPC ............. *H04L 5/0048* (2013.01); *H04B 7/10* (2013.01)

(58) Field of Classification Search
CPC ........ H04B 7/0695; H04B 7/088; H04B 7/10; H04L 5/0023; H04L 5/0048
See application file for complete search history.

(56) References Cited

U.S. PATENT DOCUMENTS

| | | | |
|---|---|---|---|
| 7,253,906 B2 | 8/2007 | Friessnegg et al. | |
| 10,911,127 B2* | 2/2021 | Nilsson | H04L 5/0048 |
| 2017/0244467 A1* | 8/2017 | Cho | H04B 7/10 |

FOREIGN PATENT DOCUMENTS

| | | |
|---|---|---|
| EP | 1367741 A2 | 12/2003 |
| EP | 3082274 A1 | 10/2016 |
| GB | 2548335 A | 9/2017 |

(Continued)

OTHER PUBLICATIONS

"Cell measurement with NR-SS and CSI-RS", 3GPP TSG-RAN WG2 2017 RAN2#97bis Meeting; R2-1703724 Spokane, USA, Apr. 3-7, 2017, pp. 1-5.

(Continued)

*Primary Examiner* — David S Huang
(74) *Attorney, Agent, or Firm* — Murphy, Bilak & Homiller, PLLC

(57) ABSTRACT

There is provided mechanisms for performing beam management. A method is performed by a radio transceiver device. The method comprises transmitting a reference signal in a transmission beam as part of the beam 5 management. The reference signal in the transmission beam occupies time/frequency resources that extend over a frequency interval. The transmission beam has a frequency-dependent polarization over the frequency interval.

26 Claims, 5 Drawing Sheets

(56) References Cited

FOREIGN PATENT DOCUMENTS

| WO | 2011050866 A1 | 5/2011 |
|---|---|---|
| WO | 2015169368 A1 | 11/2015 |
| WO | 2016148127 A1 | 9/2016 |
| WO | 2017025768 A1 | 2/2017 |
| WO | 2017053756 A1 | 3/2017 |
| WO | 2017123060 A1 | 7/2017 |

OTHER PUBLICATIONS

Zeng, Yong, et al., "Optimized Training Design for Multi-Antenna Wireless Energy Transfer in Frequency-Selective Channel", IEEE ICC 2015—Wireless Communications Symposium, 2015, pp. 2129-2134.

* cited by examiner

BEAM MANAGEMENT OF A RADIO TRANSCEIVER DEVICE

TECHNICAL FIELD

Embodiments presented herein relate to a method, a radio transceiver device, a computer program, and a computer program product for performing beam management. Embodiments presented herein further relate to a method, a radio transceiver device, a computer program, and a computer program product for participating in beam management.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

In a communications network where a transmission and reception point (TRP) at the network side uses narrow beams for transmission, at least one of the narrow transmission beams is assumed to be discovered and monitored for each served wireless device at the user side. This process of discovering and monitoring is referred to as beam management. In order to perform beam management the network node uses measurements (such as received reference signal power), as obtained and reported by the served wireless devices, on downlink reference signals such as channel state information reference signals (CSI-RS). The beam pair for which the highest received reference signal power was obtained is then used as the active beam pair link. In general terms, a beam pair is defined by a transmission beam at the transmitting end (such as at the TRP) and a corresponding reception beam at the receiving end (such as at the wireless device), where the transmission beam and the reception beam are selected from sets of available candidate beams so as to maximize a quality criterion (such as highest received reference signal power) for transmission from the transmitting end to the receiving end.

The CSI-RS for beam management might be transmitted periodically, semi-persistently or aperiodically (for example when being event triggered) and they might either be shared between multiple terminal devices or be specific for a certain terminal device, or group of terminal devices. In order to find a suitable TRP transmission beam to serve one or more of the terminal devices the TRP transmits CSI-RS in different TRP transmission beams on which the terminal devices perform measurements (such as measurements of reference signal received power, RSRP) and report back the N best TRP transmission beams with best measurements (such as highest RSRP). The value of N could be configured by the network. Different TRP transmission beams might be transmitted in different CSI-RS resources (i.e. one TRP transmission beam corresponds to one CSI-RS resource), and the terminal devices might report back N CSI-RS resource indicators (CRIs) to inform the TRP which TRP transmission beams that gave the best measurements.

If the TRP has dual-polarized antennas, each CSI-RS resource could be configured with two antenna ports; one antenna port per polarization. Thereby each TRP transmission beam is transmitted over two polarizations. In this case the terminal devices can measure an average RSRP over both polarizations and then report back the best TRP transmission beam(s) based on the average RSRP for each beam.

Alternatively, each CSI-RS resource might be configured with only one antenna port. This means that the CSI-RS is transmitted over one polarization. One advantage with using one-port CSI-RS resources compared to two-port CSI-RS resources for beam management is, for example, that the TRP transmission beam sweeps can be performed twice as quick for TRPs with analog antenna arrays. The reason for this is because then two TRP transmission beams (one per polarization) pointing in mutually different directions can be transmitted simultaneously. This means that half of the TRP transmission beams can be evaluated on one polarization for one antenna array and the other half of the TRP transmission beams on the other polarization on another antenna array (assuming that the antenna arrays are pointing in the same direction). Hence the beam sweeping will take half the time compared to two-port beam sweeping. One drawback with single-port CSI-RS resources is that, due to that the CSI-RS is transmitted in one polarization only, there is not any information of how good the performance is for the same TRP transmission beam in the other polarization. In case the RSRP differs much between different polarizations for the same TRP transmission beam, there is a risk that a non-optimal TRP transmission beam is chosen by the terminal device. Hence, although one-port CSI-RS for beam management is less time consuming than two-port CSI-RS, it is less reliable.

Hence, there is still a need for improved beam management in a communications network.

SUMMARY

An object of embodiments herein is to provide efficient beam management that does not suffer from the issues noted above, or at least where the issues noted above are mitigated.

According to a first aspect there is presented a method for performing beam management. The method is performed by a radio transceiver device. The method comprises transmitting a reference signal in a transmission beam as part of the beam management. The reference signal in the transmission beam occupies time/frequency resources that extend over a frequency interval. The transmission beam has a frequency-dependent polarization over the frequency interval.

According to a second aspect there is presented a radio transceiver device for performing beam management. The radio transceiver device comprises processing circuitry. The processing circuitry is configured to cause the radio transceiver device to transmit a reference signal in a transmission beam as part of the beam management. The reference signal in the transmission beam occupies time/frequency resources that extend over a frequency interval. The transmission beam has a frequency-dependent polarization over the frequency interval.

According to a third aspect there is presented a radio transceiver device for performing beam management. The radio transceiver device comprises: processing circuitry and a storage medium. The storage medium stores instructions that, when executed by the processing circuitry, cause the radio transceiver device to transmit a reference signal in a transmission beam as part of the beam management. The reference signal in the transmission beam occupies time/frequency resources that extend over a frequency interval. The transmission beam has a frequency-dependent polarization over the frequency interval.

According to a fourth aspect there is presented a radio transceiver device for performing beam management. The radio transceiver device comprises a transmit module configured to transmit a reference signal in a transmission beam as part of the beam management. The reference signal in the transmission beam occupies time/frequency resources that extend over a frequency interval. The transmission beam has a frequency-dependent polarization over the frequency interval.

According to a fifth aspect there is presented a computer program for performing beam management. The computer program comprises computer program code which, when run on processing circuitry of a radio transceiver device, causes the radio transceiver device to perform a method according to the first aspect.

According to a sixth aspect there is presented a method for participating in beam management. The method is performed by a radio transceiver device. The method comprises receiving a reference signal transmitted in a transmission beam from another radio transceiver device as part of participating in the beam management. The reference signal in the transmission beam occupies time/frequency resources that extend over a frequency interval. The transmission beam has a frequency-dependent polarization over the frequency interval.

According to a seventh aspect there is presented a radio transceiver device for participating in beam management. The radio transceiver device comprises processing circuitry. The processing circuitry is configured to cause the radio transceiver device to receive a reference signal transmitted in a transmission beam from another radio transceiver device as part of participating in the beam management. The reference signal in the transmission beam occupies time/frequency resources that extend over a frequency interval. The transmission beam has a frequency-dependent polarization over the frequency interval.

According to an eighth aspect there is presented a radio transceiver device for participating in beam management. The radio transceiver device comprises processing circuitry and a storage medium. The storage medium stores instructions that, when executed by the processing circuitry, cause the radio transceiver device to receive a reference signal transmitted in a transmission beam from another radio transceiver device as part of participating in the beam management. The reference signal in the transmission beam occupies time/frequency resources that extend over a frequency interval. The transmission beam has a frequency-dependent polarization over the frequency interval.

According to a ninth aspect there is presented a radio transceiver device for participating in beam management. The radio transceiver device comprises a receive module configured to receive a reference signal transmitted in a transmission beam from another radio transceiver device as part of participating in the beam management. The reference signal in the transmission beam occupies time/frequency resources that extend over a frequency interval. The transmission beam has a frequency-dependent polarization over the frequency interval.

According to a tenth aspect there is presented a computer program for participating in beam management, the computer program comprising computer program code which, when run on processing circuitry of a radio transceiver device, causes the radio transceiver device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these radio transceiver devices, these computer programs, and this computer program product provide efficient beam management.

Advantageously these methods, these radio transceiver devices, these computer programs, and this computer program product enable beam management that does not suffer from the issues noted above, or at least where the issues noted above are mitigated.

Advantageously, by varying the polarization over the entire frequency band of interest for each reference signal during beam management, the beam selection will be less sensitive to polarization mismatch, which will improve the beam selection, and hence the performance in the communications network.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
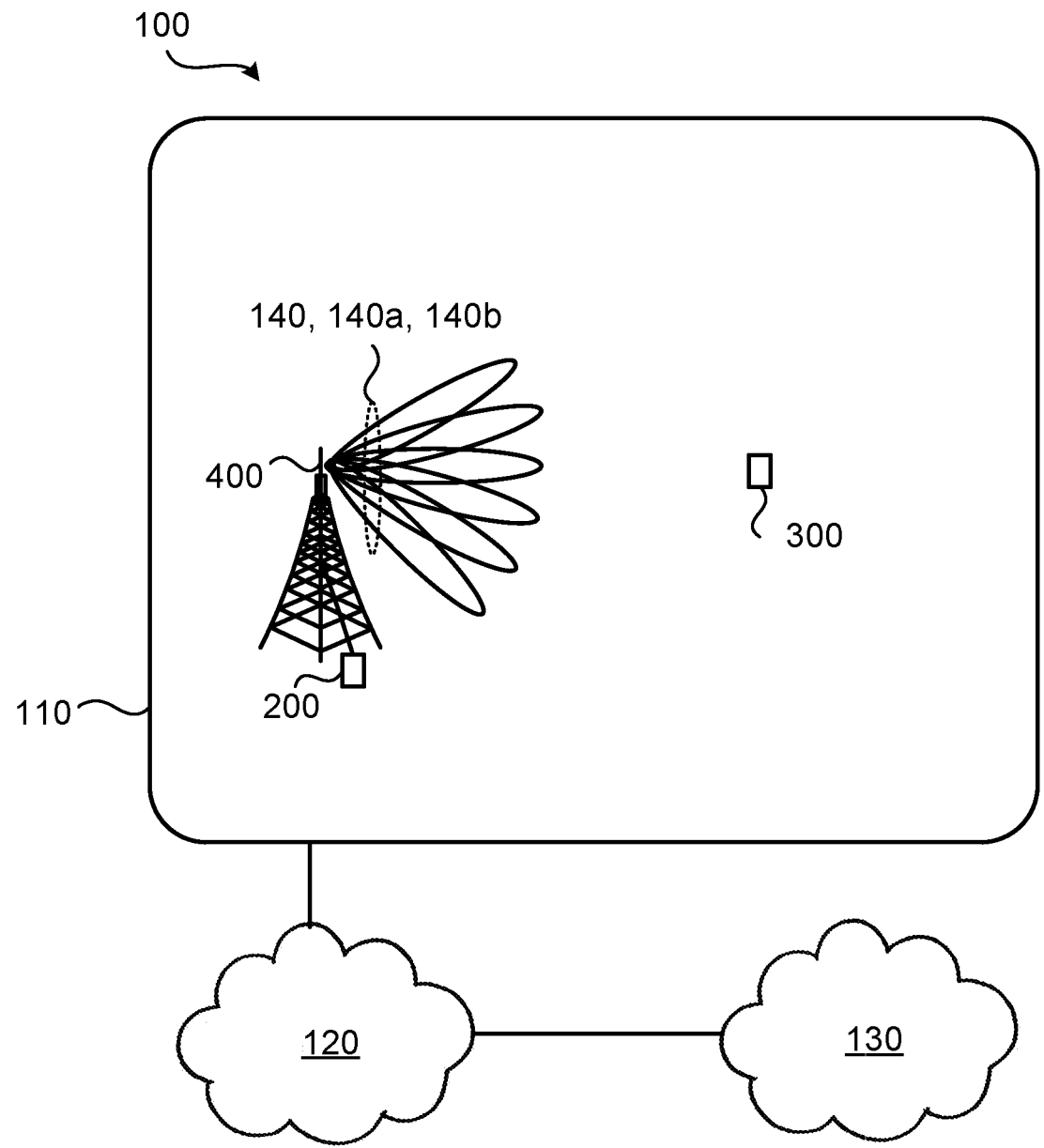
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a radio transceiver device 200 configured to, via TRP 400, provide network access to radio transceiver device 300 in a radio access network 110. In some embodiments radio transceiver device 300 is part of, integrated with, or collocated with, a terminal device and radio transceiver device 200 is part of, integrated with, or collocated with, a network node or the TRP 400.

The radio access network 110 is operatively connected to a core network 120. The core network 120 is in turn operatively connected to a service network 130, such as the Internet. Radio transceiver device 300 is thereby, via the TRP 400 and radio transceiver device 200, enabled to access services of, and exchange data with, the service network 130.

Examples of network nodes are radio access network nodes, radio base stations, base transceiver stations, Node Bs, evolved Node Bs, g Node Bs, access points, and access nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

The herein disclosed embodiments can be applied at a radio transceiver device implemented both as a radio access network node and a terminal device, or even as a radio transceiver device implemented as a backhauling node or a sidelink node. Thus, although radio transceiver device 200 in at least some of the herein disclosed embodiments is described as being a network node and radio transceiver device 300 is described as being a terminal device, the functionality of the herein disclosed radio transceiver device 200 could equally be implemented in a terminal device, and vice versa for radio transceiver device 300.

Radio transceiver device 200 is, via TRP 400, configured to communicate with radio transceiver device 300 in beams 140, 140a, 140b. Radio transceiver device 200 could be configured to communicate using a variety of beams having different shapes and widths, herein generally referred to as having different beam patterns.

The embodiments disclosed herein relate to mechanisms for performing beam management. In order to obtain such mechanisms there is provided a radio transceiver device 200, a method performed by the radio transceiver device 200, a computer program product comprising code, for example in the form of a computer program, that when run on processing circuitry of the radio transceiver device 200, causes the radio transceiver device 200 to perform the method. The embodiments disclosed herein further relate to mechanisms for participating in beam management. In order to obtain such mechanisms there is further provided a radio transceiver device 300, a method performed by the radio transceiver device 300, and a computer program product comprising code, for example in the form of a computer program, that when run on processing circuitry of the radio transceiver device 300, causes the radio transceiver device 300 to perform the method.

Figure 2:
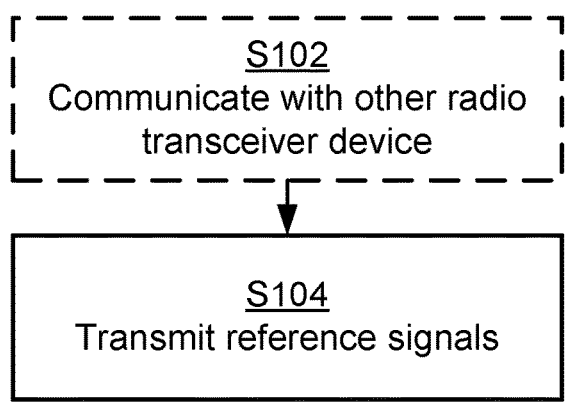
FIGS. 2 and 5 are flowcharts of methods according to embodiments.

Reference is now made to FIG. 2 illustrating a method for performing beam management as performed by the radio transceiver device 200 according to an embodiment.

The embodiments disclosed herein are based on changing the polarization for each TRP transmission beam, in which a reference signal is transmitted, over the frequency band. Thus, the radio transceiver device 200 is configured to perform step S104:

S104: The radio transceiver device 200 transmits a reference signal in a transmission beam 140, 140a, 140b as part of the beam management. The reference signal in the transmission beam 140, 140a, 140b occupies time/frequency resources that extend over a frequency interval. The transmission beam 140, 140a, 140b has a frequency-dependent polarization over the frequency interval.

Typically, one reference signal is transmitted in each transmission beam 140, 140a, 140b and, during beam management, many such transmission beams 140, 140a, 140b are tested by radio transceiver device 300 to find the best beam.

The polarization is thereby varied over the frequency interval, which might enable frequency diversity to be attained during beam management procedures. This could increase the probability of a good transmission beam to be selected by a radio transceiver device 300 at least such transmission beam during the beam management.

Embodiments relating to further details of performing beam management as performed by the radio transceiver device 200 will now be disclosed.

In some aspects the radio transceiver device 200 is a network node, and the reference signal is transmitted at a TRP 400 of the network node.

There may be different ways for the radio transceiver device 200 to perform the beam management during which the reference is transmitted in the transmission beam 140, 140a, 140b. Different embodiments relating thereto will now be described in turn.

The beam management might be performed periodically, semi-persistently or aperiodically (for example when being event triggered), and thus the reference signal in each transmission beam 140, 140a, 140b might be transmitted periodically, semi-persistently or aperiodically.

Beam management might is generally performed before data communication, to set up proper beam pair link(s). For longer data sessions, the beam pair links might need to be updated in order to enable continued communications. In this latter case, beam management and data communications might be alternating. In some aspects the radio transceiver device 200 thus already has an established connection with the radio transceiver device 300 and the beam management is for continued communications. Thus, according to an embodiment the radio transceiver device 200 is configured to perform (optional) step S102:

S102: The radio transceiver device 200 communicates, using a current transmission beam 140, 140a, 140b, with radio transceiver device 300 before transmitting the reference signal. The beam management is for continued communications with radio transceiver device 300.

There could be different ways for the radio transceiver device 200 to enable the transmission beam 140, 140a, 140b to have frequency-dependent polarization over the frequency interval. In some aspects the change of polarization is caused by beamforming weights used for generating the transmission beam 140, 140a, 140b. Particularly, according to an embodiment the frequency-dependent polarization depends on beamforming weights of the transmission beam 140, 140a, 140b as applied by the radio transceiver device 200 for transmitting the reference signal.

Figure 3:
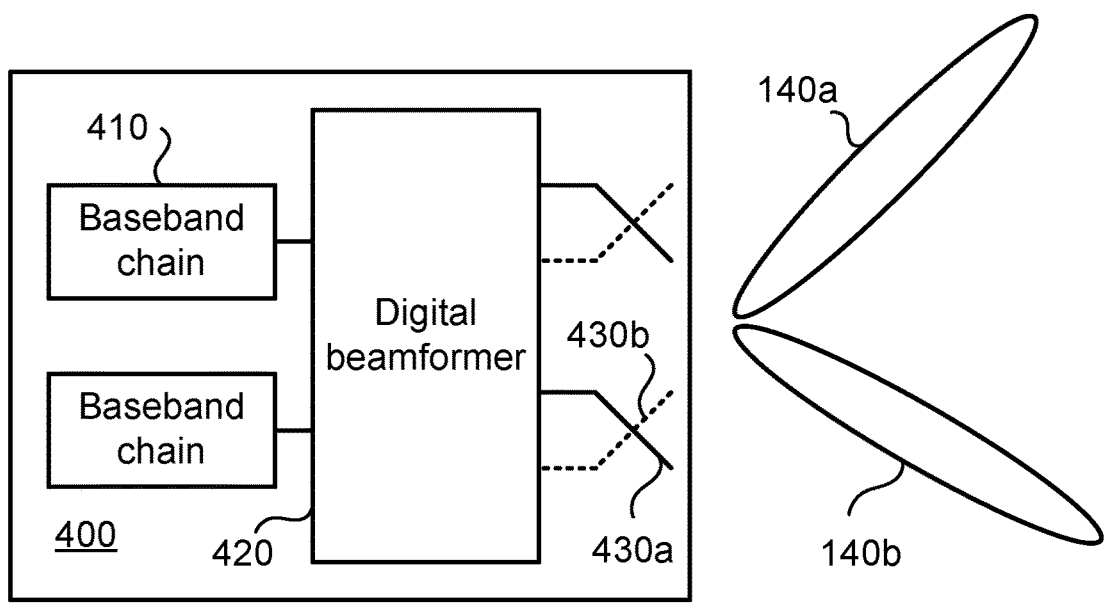
FIGS. 3 and 4 are schematic illustrations of a transmission and reception point according to embodiments.
Figure 4:
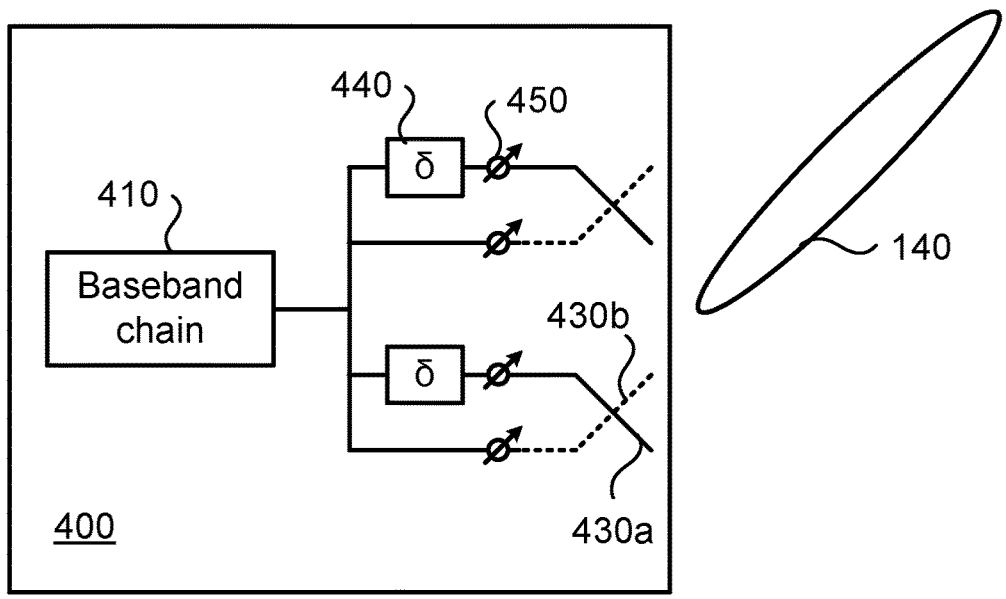

There could be different antenna configuration that might be used when transmitting the reference signal. FIGS. 3 and 4 illustrate a TRP 400 according to two different embodiments.

The TRP 400 of FIG. 3 comprises two baseband chains 410 operatively connected to an antenna array via a digital beamformer 420. The antenna array comprises a first antenna element set 430a and a second antenna element set 430b. The TRP 400 of FIG. 3 is thereby capable of simultaneously creating two transmission beams 140a, 140b. According to an embodiment the reference signal is thus provided from at least two baseband chains 410. The reference signal is then transmitted using digital beamforming.

The TRP 400 of FIG. 4 comprises one single baseband chain 410 operatively connected to an antenna array via an analog distribution network comprising time delay elements 440 and phase shifters 450 (and optional power amplifiers, not shown). Examples of component that can be used to implement time delay elements 440 are delay lines based on bulk acoustic waves (BAWs) or surface acoustic waves (SAWs) techniques. The antenna array comprises a first antenna element set 430a and a second antenna element set 430b. The TRP 400 of FIG. 4 is thereby capable of simultaneously creating only one single transmission beam 140. According to an embodiment the reference signal is thus provided from a single baseband chain 410. The reference signal is then transmitted using analog beamforming.

Further aspects of the TRPs 400 of FIGS. 3 and 4 and how they might be used to enable the transmission beam 140, 140a, 140b to have a frequency-dependent polarization over the frequency interval will now be disclosed.

In some aspects the reference signal is transmitted using antennas of two polarizations. The two polarizations might be mutually orthogonal. That is according to an embodiment the reference signal is transmitted using a first antenna element set 430a of a first polarization and a second antenna element set 430b of a second polarization.

Continued reference is now made to FIG. 3.

In some aspects the change of polarization over the frequency interval is caused by a frequency-dependent phase shift, hereinafter denoted $\beta(f)$, where f is frequency, and where f runs over the frequency interval. Particularly, according to an embodiment the beamforming weights as applied to the first antenna element set 430a and the beamforming weight as applied to the second antenna element set 430b differ by a frequency-dependent phase shift. The frequency-dependent phase shift causes the frequency-dependent polarization to occur over the frequency interval.

Although illustrated as having only two baseband chains 410, the TRP 400 of FIG. 3 might be implemented using from 1 up to 2-M number of baseband chains 410, where M is equal to the number of dual-polarized antenna elements. For simplicity, the TRP 400 in FIG. 3 is illustrated as having one antenna array with only two dual-polarized antenna elements connected to two baseband chains 410 and the TRP 400 is configured to perform a TRP transmission beam sweep with simultaneously using only one or two TRP transmission beams. The herein disclosed embodiments could be applied for antenna arrays with any number of antenna elements and any number of TRP transmission beams.

The TRP transmission beam sweep in FIG. 3 is performed by applying beamforming weights on a reference signal for both polarizations, where for transmission beam 140a (denoted beam A) the beamforming weights for the first antenna element set 430a are $e^{j\phi_{1A}}$ and $e^{j\phi_{2A}}$, where for transmission beam 140b (denoted beam B) the beamforming weights for the first antenna element set 430a are $e^{j\phi_{1B}}$ and $e^{j\phi_{2B}}$, where for transmission beam 140a the beamforming weights for the second antenna element set 430b are $e^{j(\phi_{1A}+\beta(f))}$ and $e^{j(\phi_{2A}+\beta(f))}$, and where for transmission beam 140b the beamforming weights for the second antenna element set 430b are $e^{j(\phi_{1B}+\beta(f))}$ and $e^{j(\phi_{2B}+\beta(f))}$.

The phase difference between antenna elements of the same polarization is thus identical for both polarizations, namely $(\phi_{1A}-\phi_{2A})$ and $(\phi_{1B}-\phi_{2B})$, for beam A and beam B, respectively, such that the beam for respective polarization points in the same direction. The only difference between the beamforming weights of the two polarizations is an extra frequency-dependent phase shift, $(\beta(f))$, applied on all antenna elements for one of the two polarization (the second antenna element set 430b in the above illustrative example). This frequency-dependent phase shift is the same for all antenna elements of that polarization. Hence, the frequency-dependent phase shift will not affect the pointing direction of the transmission beam, but only effects the phase difference between the two polarizations over the frequency interval. The frequency-dependent phase shift can be generated at the baseband or, in case digital beamforming is used, in the digital beamformer 420.

Continued reference is now made to FIG. 4.

In some aspects the change of polarization over the frequency interval is caused by a time delay value, hereinafter denoted $\delta$. That is, according to an embodiment the transmission of the reference signal at the first antenna element set 430a and the second antenna element set 430b differ by a time delay value $\delta$. The time shift caused by the time delay value $\delta$ will result in a frequency-dependent phase offset between the antenna elements of the two polarizations and thus the total polarization will change over frequency. That is, the time delay value $\delta$ causes the frequency-dependent polarization to occur over the frequency interval. The time delay caused by the time delay value $\delta$ is implemented in the time delay elements 440.

There could be different ways to select the time delay value $\delta$. In some aspects the time delay value $\delta$ is a function of the total requested phase shift in radians of the polarization over the frequency interval. In more detail, a phase shift of $2\pi$ over the frequency interval will result in all possible polarization states, i.e. one cycle, given equal power per polarization. The relation between the total phase shift a over the frequency interval, the frequency interval B and the required time delay value $\delta$ is according to an embodiment given by Equation (1):

$$\alpha = 2\pi \cdot B \cdot \delta \quad (1)$$

That is, according to an embodiment the time delay value $\delta$ is determined according to $\delta=\alpha/(2\pi \cdot B)$, where B is the frequency interval in Herz, and $\alpha$ is the total phase shift in radians of the polarization over the frequency interval B. According to an embodiment $\alpha \geq 2\pi$ so as to ensure that all possible polarization states are traversed across the frequency interval. For example, a frequency interval of 10 MHz and a phase shift of $2\pi$ requires a time offset of $\delta=0.1$ μs, corresponding to approximately 10% of the cyclic prefix, assuming an OFDM scale factor of 5 (where OFDM is short for orthogonal frequency-division multiplexing), as used in some 5G telecommunications systems.

Figure 5:
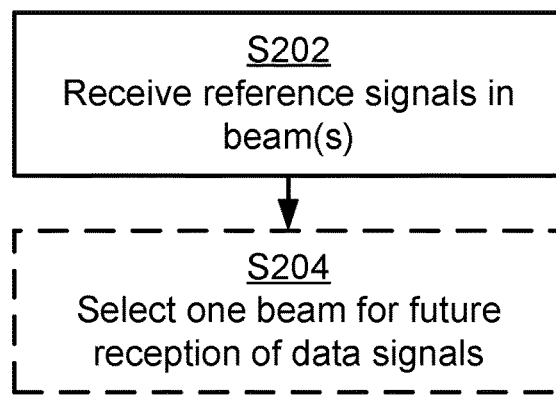

Reference is now made to FIG. 5 illustrating a method for participating in beam management as performed by the radio transceiver device 300 according to an embodiment.

As disclosed above, the radio transceiver device 200 in step S104 transmits a reference signal in a transmission beam 140, 140a, 140b as part of the beam management. It is here assumed that the reference signal is received by the radio transceiver device 300. Thus, the radio transceiver device 300 is configured to perform step S202:

S202: The radio transceiver device 300 receives a reference signal transmitted in a transmission beam 140, 140a, 140b from radio transceiver device 200 as part of participating in the beam management. The reference signal in the transmission beam 140, 140a, 140b occupies time/frequency resources that extend over a frequency interval. The transmission beam 140, 140a, 140b has a frequency-dependent polarization over the frequency interval.

In some aspects the radio transceiver device 300 is a terminal device.

Embodiments relating to further details of performing beam management as performed by the radio transceiver device 200 and participating in beam management as performed by the radio transceiver device 300 will now be disclosed.

Further aspects of how the polarization is changed over the frequency interval will now be disclosed.

Figure 6:
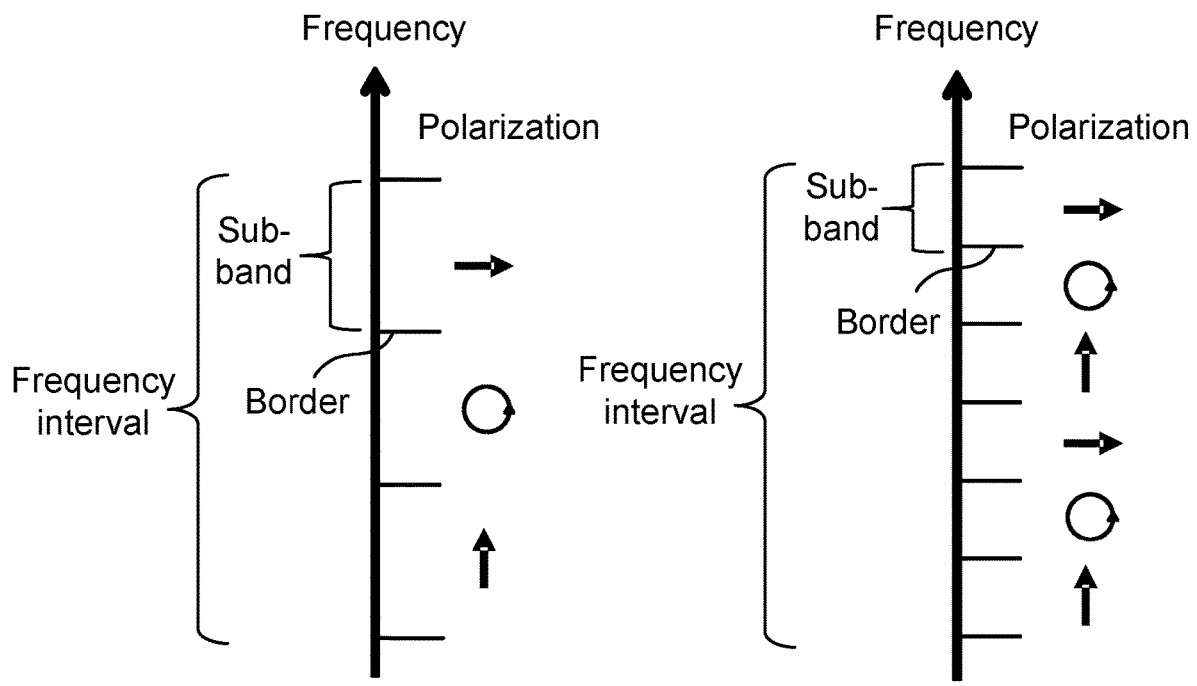
FIG. 6 is a schematic illustration of polarization as a function of frequency according to embodiments.

Reference is made to FIG. 6, schematically illustrating polarization as a function of frequency according to two illustrative examples.

In some aspects the polarization changes over frequency sub-bands, where each sub-band has one polarization. Particularly, according to an embodiment the frequency interval is divided into at least two frequency sub-bands, and the polarization changes between two neighbouring frequency sub-bands. In FIG. 6 each sub-band has one polarization. Any type of polarizations, such as linear, elliptic, and/or circular, or combinations thereof could be used to maximize diversity.

In some aspects the coherency bandwidth is estimated and the sub-band size is based at least partly on this estimate. That is, according to an embodiment the reference signal is transmitted in a radio propagation channel having a coherence bandwidth. Where to place borders between each pair of neighbouring frequency sub-bands might then depend on the coherence bandwidth.

Generally, we have that the smaller the sub-band is, the better the diversity will be. However, if the sub-band becomes smaller than the coherency bandwidth, the processing gain can be negatively affected, which can decrease the link budget. Hence, when determining the sub-band size there is a tradeoff between diversity and link budget, which depends on the coherency bandwidth.

The transmission of the reference signal in the transmission beam 140, 140a, 140b is part of beam management. Such beam management generally involves a beam sweep where reference signal is transmitted in multiple transmission beams, each in its own direction. The direction is generally defined by a beam pattern. Particularly, according to an embodiment the reference signal is transmitted in at least two transmission beams 140, 140a, 140b, where each of the transmission beams 140, 140a, 140b has its own beam pattern.

During a beam management procedure, it could be preferred that the same frequency-dependent polarization is used for each generated transmission beam such that the radio transceiver device 300 will compare reference signals in transmission beams using similar polarizations. The same frequency-dependent polarization might thus be used for each generated beam. That is, each of at least two transmission beams 140, 140a, 140b might have the same frequency-dependent polarization over the frequency interval. However, in other aspects the function β(f) is unique per beam, thus resulting in different frequency-dependent polarization for each generated beam. That is, each of at least two transmission beams 140, 140a, 140b might alternatively have different frequency-dependent polarization over the frequency interval.

According to an embodiment the radio transceiver device 300 is configured to perform (optional) step S204:

S204: The radio transceiver device 300 selects one of the at least two transmission beams 140, 140a, 140b for future reception of data signals from radio transceiver device 200.

It is in this respect noted that in the example of FIG. 3, two transmission beams 140a, 140b might be simultaneously transmitted. However, the present embodiment generally refers to a beam sweep involving sequential transmission of the reference signal in the transmission beams.

There could be different types of reference signals. Which reference signal to transmit might depend on which type of radio transceiver device 200 is transmitting the reference signal. According to an embodiment the reference signal is a CSI-RS, or is defined by a synchronization signal (SS) block. This could be a typical case where the radio transceiver device 200 is a network node.

According to an embodiment the reference signal is a sounding reference signal (SRS). This could be a typical case where the radio transceiver device 200 is a terminal device.

The SS block might be transmitted using a wider transmission beam than when transmitting CSI-RS. In some aspects the beam width of the transmission beam 140, 140a, 140b thus depends on the type of reference signal. That is, according to an embodiment the transmission beam 140, 140a, 140b has a beam width that depends on which type of reference signal is transmitted in the transmission beam 140, 140a, 140b.

There could be different ways to generate beams of different widths. For example, by applying principles disclosed in document WO2011/050866A1 it is, for example, possible to generate as wide beam widths (for the transmission beams 140, 140a, 140b) as the antenna element beam width, regardless of how many antenna elements there are in the antenna array, thus resulting in dual-polarization beamforming. Dual-polarization beamforming can thus be used to selectively widening or narrowing the transmission beams 140, 140a, 140b as needed. Hence, principles disclosed in document WO2011/050866A1 can be applied to the TRP 400 in order to generate the transmission beams 140, 140a, 140b. Other examples of principles that could be used to generate transmission beams 140, 140a, 140b with beam widths as needed are based on optimizing complex weights of the antenna array or by muting some antenna elements of the antenna array. A way to generate wide (as well as narrow) transmission beams 140, 140a, 140b with phase shifts only is by means of the array expansion technique described in WO2016141961 A1. WO2016141961 A1 relates to beam forming using an antenna array comprising dual polarized elements.

Figure 7:
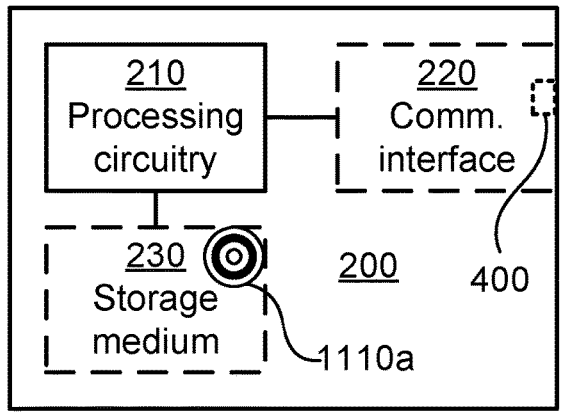
FIG. 7 is a schematic diagram showing functional units of a radio transceiver device according to an embodiment.

FIG. 7 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, S102-s104, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The radio transceiver device 200 may further comprise a communications interface 220 for communications with other nodes, entities, devices, and functions, such as radio transceiver device 300, in the communications network 100. As such the communications interface 220 may comprise one or more transmitters and receivers, comprising analogue and digital components. Signals, such as reference signals as well as data signals, could be transmitted from, and received by, a TRP 400 of the radio transceiver device 200. The TRP 400 could form an integral part of the radio transceiver device 200 or be physically separated from the radio transceiver device 200. The communications interface 220 might thus optionally comprise the TRP 400.

The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200 are omitted in order not to obscure the concepts presented herein.

Figure 8:
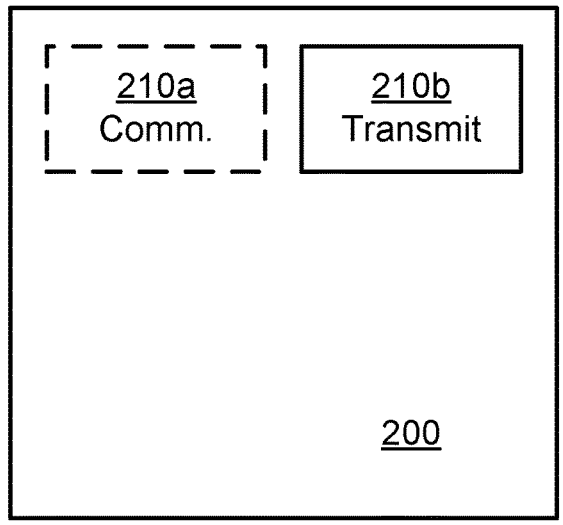
FIG. 8 is a schematic diagram showing functional modules of a radio transceiver device according to an embodiment.

FIG. 8 schematically illustrates, in terms of a number of functional modules, the components of a radio transceiver device 200 according to an embodiment. The radio transceiver device 200 of FIG. 8 comprises a transmit module 210b configured to perform step S104. The radio transceiver device 200 of FIG. 8 may further comprise a number of optional functional modules, such as a communications module 210a configured to perform step S102. In general terms, each functional module 210a-210b may be implemented in hardware or in software. Preferably, one or more or all functional modules 210a-210b may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210b and to execute these instructions, thereby performing any steps of the radio transceiver device 200 as disclosed herein.

Figure 9:
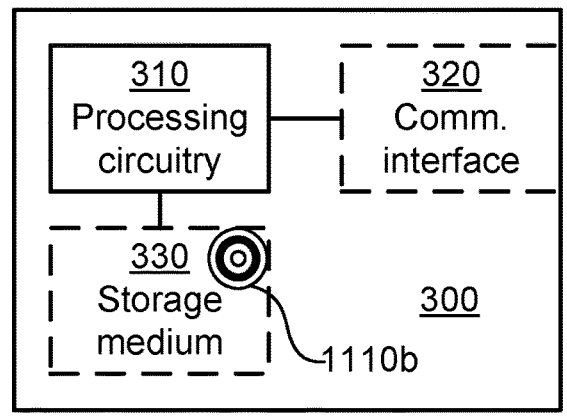
FIG. 9 is a schematic diagram showing functional units of a radio transceiver device according to an embodiment.

FIG. 9 schematically illustrates, in terms of a number of functional units, the components of a radio transceiver device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the radio transceiver device 300 to perform a set of operations, or steps, S202-S204, as disclosed above. For example, the storage medium 330 may store the set of operations, and the processing circuitry 310 may be configured to retrieve the set of operations from the storage medium 330 to cause the radio transceiver device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The radio transceiver device 300 may further comprise a communications interface 320 for communications with other nodes, entities, devices, and functions, such as radio transceiver device 300, in the communications network 100. As such the communications interface 320 may comprise one or more transmitters and receivers, comprising analogue and digital components.

The processing circuitry 310 controls the general operation of the radio transceiver device 300 e.g. by sending data and control signals to the communications interface 320 and the storage medium 330, by receiving data and reports from the communications interface 320, and by retrieving data and instructions from the storage medium 330. Other components, as well as the related functionality, of the radio transceiver device 300 are omitted in order not to obscure the concepts presented herein.

Figure 10:
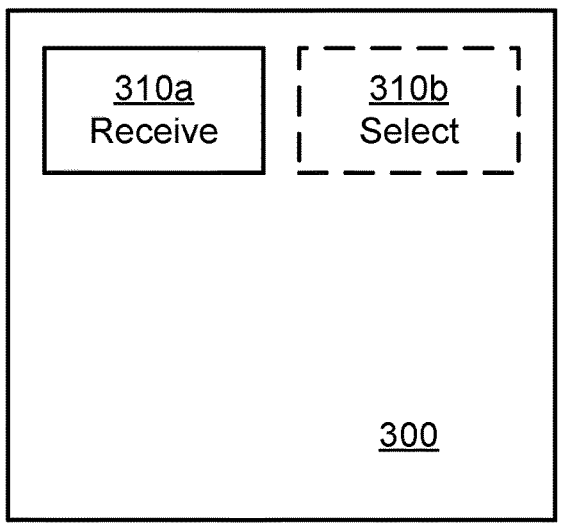
FIG. 10 is a schematic diagram showing functional modules of a radio transceiver device according to an embodiment.

FIG. 10 schematically illustrates, in terms of a number of functional modules, the components of a radio transceiver device 300 according to an embodiment. The radio transceiver device 300 of FIG. 10 comprises a receive module 310a configured to perform step S202. The radio transceiver device 300 of FIG. 10 may further comprise a number of optional functional modules, such as a select module 310b configured to perform step S204. In general terms, each functional module 310a-310b may be implemented in hardware or in software. Preferably, one or more or all functional modules 310a-310b may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310b and to execute these instructions, thereby performing any steps of the radio transceiver device 300 as disclosed herein.

The radio transceiver device 200 and/or radio transceiver device 300 may be provided as a standalone device or as a part of at least one further device. Examples of devices in which the functionality of the radio transceiver device 200 and the radio transceiver device 300 might be provided have been given above.

A first portion of the instructions performed by the radio transceiver device 200 and/or radio transceiver device 300 may be executed in a respective first device, and a second portion of the of the instructions performed by the radio transceiver device 200 and/or radio transceiver device 300 may be executed in a respective second device; the herein disclosed embodiments are not limited to any particular number of devices on which the instructions performed by the radio transceiver device 200 and/or radio transceiver device 300 may be executed. Hence, the methods according to the herein disclosed embodiments are suitable to be performed by a radio transceiver device 200 and/or radio transceiver device 300 residing in a cloud computational environment. Therefore, although a single processing circuitry 210, 310 is illustrated in FIGS. 7 and 9 the processing circuitry 210, 310 may be distributed among a plurality of devices, or nodes. The same applies to the functional modules 210a-210b, 310a-310b of FIGS. 8 and 10 and the computer programs 1120a, 1120b of FIG. 11 (see below).

Figure 11:
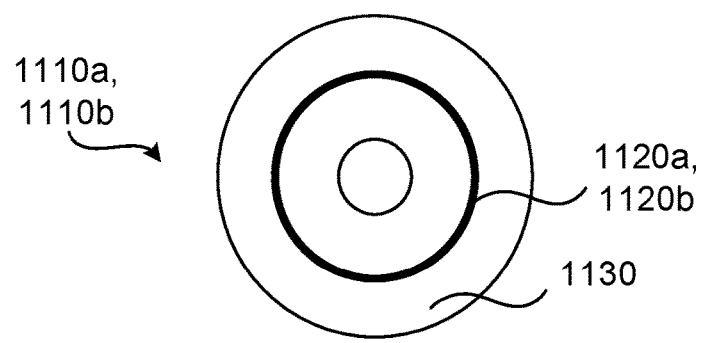
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the radio transceiver device 200 as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the radio transceiver device 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam management performed by a radio transceiver device, the method comprising:
transmitting a reference signal in a transmission beam as part of the beam management,
wherein the reference signal in the transmission beam occupies time/frequency resources that extend over a frequency interval, and
wherein the transmission beam has a frequency-dependent polarization over the frequency interval.

2. The method according to claim 1, wherein:
the method further comprises, using a current transmission beam, communicating with another radio transceiver device before transmitting the reference signal; and
the beam management is for continued communications with the other radio transceiver device.

3. The method according to claim 1, wherein the frequency-dependent polarization depends on beamforming weights of the transmission beam as applied by the radio transceiver device for transmitting the reference signal.

4. The method according to claim 1, wherein the reference signal is transmitted using a first antenna element set having a first polarization and a second antenna element set having a second polarization.

5. The method according to claim 4, wherein:
the beamforming weights as applied to the first antenna element set and the beamforming weight as applied to the second antenna element set differ by a frequency-dependent phase shift; and
the frequency-dependent phase shift causes the frequency-dependent polarization over the frequency interval.

6. The method according to claim 5, wherein:
the reference signal is provided from at least two baseband chains, and
the reference signal is transmitted using digital beamforming.

7. The method according to claim 4, wherein:
transmission of the reference signal at the first antenna element set and the second antenna element set differ by a time delay value δ; and
the time delay value δ causes the frequency-dependent polarization over the frequency interval.

8. The method according to claim 7, wherein the time delay value δ is determined according to $\delta = \alpha/(2\pi \cdot B)$, where B is the frequency interval in Hz, and α is total phase shift in radians of the polarization over the frequency interval B.

9. The method according to claim 8, wherein $\alpha > 2\pi$.

10. The method according to claim 7, wherein:
the reference signal is provided from a single baseband chain; and
the reference signal is transmitted using analog beamforming.

11. The method according to claim 1, wherein:
the frequency interval is divided into at least two frequency sub-bands; and
the polarization changes between two neighbouring ones of the at least two frequency sub-bands.

12. The method according to claim 11, wherein a border between the two neighbouring ones of the at least two frequency sub-bands is based on a coherence bandwidth of a radio propagation channel in which the reference signal is transmitted.

13. The method according to claim 1, wherein the reference signal is transmitted in at least two transmission beams having respective beam patterns.

14. The method according to claim 13, wherein the at least two transmission beams have the same frequency-dependent polarization over the frequency interval.

15. The method according to claim 1, wherein:
the radio transceiver device is a network node, and
the reference signal is transmitted at a transmission and reception point of the network node.

16. The method according to claim 1, wherein:
the transmission beam has a beam width that depends on a type of reference signal transmitted in the transmission beam; and
the reference signal is one of the following: a channel state information reference signal, or defined by a synchronization signal, SS, block.

17. A non-transitory, computer-readable medium storing computer-executable instructions that, when executed by processing circuitry of a radio transceiver device configured for beam management, cause the radio transceiver device to perform operations corresponding to the method of claim 1.

18. A method for beam management performed by a radio transceiver device, the method comprising:
receiving a reference signal transmitted in a transmission beam from another radio transceiver device as part of the beam management,
wherein the reference signal in the transmission beam occupies time/frequency resources that extend over a frequency interval, and
wherein the transmission beam has a frequency-dependent polarization over the frequency interval.

19. The method according to claim 18, wherein the reference signal is transmitted in at least two transmission beams having respective beam patterns.

20. The method according to claim 19, wherein the at least two transmission beams have the same frequency-dependent polarization over the frequency interval.

21. The method according to claim 19, further comprising selecting one of the at least two transmission beams for future reception of data signals from the other radio transceiver device.

22. The method according to claim 18, wherein the radio transceiver device is a terminal device.

23. The method according to claim 18, wherein:
the transmission beam has a beam width that depends on a type of reference signal transmitted in the transmission beam; and
the reference signal is one of the following: a channel state information reference signal, or defined by a synchronization signal (SS) block.

24. A radio transceiver device configured for beam management, the radio transceiver device comprising:
processing circuitry; and
a computer-readable storage medium storing instructions that, when executed by the processing circuitry, cause the radio transceiver device to perform operations corresponding to the method of claim 18.

25. A non-transitory, computer-readable medium storing computer-executable instructions that, when executed by processing circuitry of a radio transceiver device configured for beam management, cause the radio transceiver device to perform operations corresponding to the method of claim 18.

26. A radio transceiver device configured for beam management, the radio transceiver device comprising:
processing circuitry; and
a computer-readable storage medium storing instructions that, when executed by the processing circuitry, cause the radio transceiver device to:
transmit a reference signal in a transmission beam as part of the beam management,
wherein the reference signal in the transmission beam occupies time/frequency resources that extend over a frequency interval, and
wherein the transmission beam has a frequency-dependent polarization over the frequency interval.

* * * * *